(12) United States Patent
Borkowski et al.

(10) Patent No.: US 12,172,213 B2
(45) Date of Patent: Dec. 24, 2024

(54) PRODUCING ULTRA-FINE-GRAINED MATERIALS USING ADDITIVE MANUFACTURING

(71) Applicant: GOODRICH CORPORATION, Charlotte, NC (US)

(72) Inventors: Luke B. Borkowski, West Hartford, CT (US); Alexander Staroselsky, Avon, CT (US); Ranadip Acharya, Glastonbury, CT (US); Sergey Mironets, Philadelphia, PA (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/086,944

(22) Filed: Dec. 22, 2022

(65) Prior Publication Data

US 2023/0249255 A1 Aug. 10, 2023

Related U.S. Application Data

(60) Provisional application No. 63/306,750, filed on Feb. 4, 2022.

(51) Int. Cl.
*B22F 10/50* (2021.01)
*B22F 12/13* (2021.01)
(Continued)

(52) U.S. Cl.
CPC ............. *B22F 10/50* (2021.01); *B22F 12/13* (2021.01); *B22F 12/30* (2021.01); *B22F 12/43* (2021.01);
(Continued)

(58) Field of Classification Search
CPC .......... B22F 10/50; B22F 12/43; B22F 12/30; B22F 12/13; B33Y 10/00; B33Y 30/00; B33Y 40/00
See application file for complete search history.

(56) References Cited

U.S. PATENT DOCUMENTS 10,556,270 B2   2/2020   Mironets et al.
11,214,002 B2   1/2022   Acharya et al.
(Continued)

FOREIGN PATENT DOCUMENTS

CN   109773187   11/2020
CN   109676138   4/2021
EP    3808476    4/2021

OTHER PUBLICATIONS

Kumar S, Wu CS, Padhy GK, Ding W. Application of ultrasonic vibrations in welding and metal processing: a status review. J Manuf Process 2017;26:295-322. 28 Pages.
(Continued)

*Primary Examiner* — Anthony M Liang
*Assistant Examiner* — Danny N Kang
(74) *Attorney, Agent, or Firm* — SNELL & WILMER L.L.P.

(57) ABSTRACT

A method is provided for producing ultra-fine-grained materials using additive manufacturing. The method includes commanding, by a controller, a laser device to produce a plurality of optical pulses to a base material to add an additive material to the base material. The method further includes commanding, by the controller, a vibration mechanism to vibrate the base material as the plurality of optical pulses are being applied to the base material forming fine equiaxed grains with random crystallographic texture in the base material.

8 Claims, 8 Drawing Sheets

(51) Int. Cl.
*B22F 12/30* (2021.01)
*B22F 12/43* (2021.01)
*B33Y 10/00* (2015.01)
*B33Y 30/00* (2015.01)
*B33Y 40/00* (2020.01)

(52) U.S. Cl.
CPC ............... *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2007/0176312 | A1 | 8/2007 | Clark et al. |
| 2016/0228990 | A1 | 8/2016 | Bruck et al. |
| 2021/0114292 | A1* | 4/2021 | Acharya ............... B29C 64/153 |

OTHER PUBLICATIONS

Atamanenko, T., Eskin, D., Zhang, L. et al. Criteria of Grain Refinement Induced by Ultrasonic Melt Treatment of Aluminum Alloys Containing Zr and Ti. Metall Mater Trans A 41, 2056-2066 (2010). 11 pages.

Todaro, C. J., Easton, M. A., Qiu, D., Brandt, M., StJohn, D. H., & Qian, M. (2021). Grain refinement of stainless steel in ultrasound-assisted additive manufacturing. Additive Manufacturing, 37, 101632. 34 pages.

Todaro, C. J., Easton, M. A., Qiu, D., Zhang, D., Bermingham, M. J., Lui, E. W., . . . & Qian, M. (2020). Grain structure control during metal 3D printing by high-intensity ultrasound. Nature communications, 11(1), 1-9. 9 pages.

Yang, Gaolin, et al. "Laser solid forming Zr-based bulk metallic glass." Intermetallics 22 (2012): 110-115.

Ch. Suryanarayana, Mechanical behavior of emerging materials, Materials Today, 15 (11), 2012, pp. 486-498, ISSN 1369-7021, https://doi.org/10.1016/S1369-7021(12)70218-3. 14 pages.

Jie Xu, Bin Guo and Debin Shan (Aug. 9, 2017). Innovative Applications of Ultrafine-Grained Materials, Severe Plastic Deformation Techniques, Marcello Cabibbo, IntechOpen, DOI: 10.5772/intechopen.69503. 24 pages.

Webster Samantha et al, "Physical mechanisms in hybrid additive manufacturing: A process design framework", Journal of Materials Processing Technology, Elsevier, NL, vol. 291, date: Jan. 8, 2021, XP086487949, DOI: 10.1016/J.JMATPROTEC.2021.117048, retrieved on Jan. 8, 2021.

Todaro C. J. et al, "Grain structure control during metal 3D printing by high-intensity ultrasound", Nature Communications, vol. 11, No. 1, date: Jan. 9, 2020, XP093049381, DOI: 10.1038/s41467-019-13874-z, Retrieved from the internet: URL:https://www.nature.com/articles/s41467-019-13874-z>, retrieved on May 24, 2023.

European Patent Office, European Search Report dated Jun. 6, 2023 in Application No. 23020053.7.

* cited by examiner

PRODUCING ULTRA-FINE-GRAINED MATERIALS USING ADDITIVE MANUFACTURING

CROSS-REFERENCE TO RELATED APPLICATIONS

This application is a nonprovisional of, claims priority to and the benefit of, U.S. Provisional Patent Application No. 63/306,750, filed Feb. 4, 2022, and titled "METHOD OF PRODUCING ULTRA FINE GRAINED MATERIALS USING ADDITIVE MANUFACTURING," which is incorporated by reference herein in its entirety for all purposes.

FIELD

The present disclosure relates to methods of forming components using additive manufacturing and components formed using additive manufacturing.

BACKGROUND

Improving the specific strength of aerospace materials is associated in designing lightweight structures with superior performance under multiaxial fatigue conditions. For example, landing gear is subjected to multiaxial low cycle fatigue (LCF), especially during taxi, that can lead to crack growth and ultimate fracture. The strength and the fatigue properties of aerospace materials, such as Ti-6A1-4V, 300M alloy steel, and Ti-5553, may be improved creating finer, more equiaxed grain structures.

SUMMARY

Disclosed herein is a method for producing ultra-fine-grained materials using additive manufacturing, the method including: commanding, by a controller, a laser device to produce a plurality of optical pulses to a base material to add an additive material to the base material; and commanding, by the controller, a vibration mechanism to vibrate the base material as the plurality of optical pulses are being applied to the base material forming fine equiaxed grains with random crystallographic texture in the base material.

In various embodiments, the laser device is a pulsed laser. In various embodiments, the vibration mechanism is an array of ultrasonic transducers and the controller commands the array of ultrasonic transducers to vibrate the base material in a first direction. In various embodiments, the first direction is a vertical direction. In various embodiments, the vibration mechanism is a table vibrator and the controller commands the table vibrator to vibrate the base material in at least one of a second direction or a third direction. In various embodiments, the second direction is a lateral direction. In various embodiments, the third direction is a longitudinal direction. In various embodiments, the controller commands an additive powder feeder to preheat the additive material prior to being added to the base material. In various embodiments, the controller commands, an ultrasonic pulsed laser that follows a pulsed laser that is applying the plurality of optical pulses to apply ultrasonic vibrations to the base material.

Also disclosed here in a system for producing ultra-fine-grained materials using additive manufacturing, the system includes: a pulsed laser configured to apply a plurality of optical pulses to a base material to add an additive material to the base material; and a vibration mechanism configured to vibrate the base material as the plurality of optical pulses are being applied to the base material forming fine equiaxed grains with random crystallographic texture in the base material.

In various embodiments, the vibration mechanism is configured to vibrate the base material in a first direction. In various embodiments, the vibration mechanism is an array of ultrasonic transducers and the first direction is a vertical direction. In various embodiments, the vibration mechanism is configured to vibrate the base material in at least one of a second direction or a third direction. In various embodiments, the vibration mechanism is a table vibrator and the second direction is a lateral direction. In various embodiments, the vibration mechanism is a table vibrator and the third direction is a longitudinal direction. In various embodiments, the system further includes an additive powder feeder configured to preheat the additive material prior to being added to the base material. In various embodiments, the system further includes an ultrasonic pulsed laser configured to apply ultrasonic vibrations to the base material, the ultrasonic vibrations follow the pulsed laser applying the plurality of optical pulses.

Also disclosed herein is a control system for producing ultra-fine-grained materials using additive manufacturing, the control system including: a pulsed laser; an array of ultrasonic transducers; a controller; and a tangible, non-transitory memory configured to communicate with the controller, the tangible, non-transitory memory having instructions stored thereon that, in response to execution by the controller, cause the controller to perform operations including: applying, by the pulsed laser, a plurality of optical pulses to a base material to add an additive material to the base material; and vibrating, by the array of ultrasonic transducers, the base material as the plurality of optical pulses are being applied to the base material to form fine equiaxed grains with random crystallographic texture in the base material.

In various embodiments, the vibrating of the base material is in a first direction and the first direction is a vertical direction. In various embodiments, the control system further includes a table vibrator and the operations further include: vibrating, by the table vibrator, the base material in at least one of a second direction or a third direction, where the second direction is a lateral direction, and where the third direction is a longitudinal direction.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
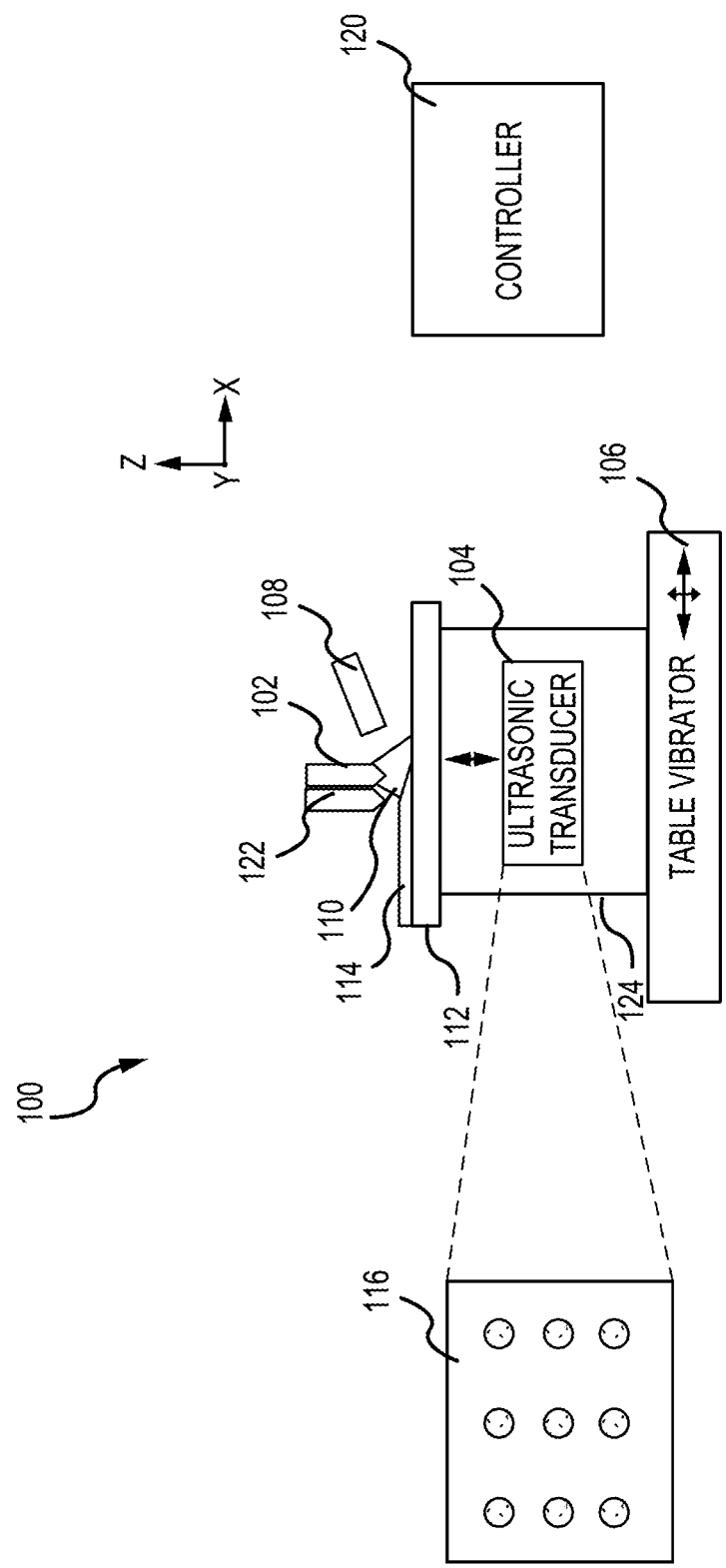
FIG. 1 illustrates an additive manufacturing system, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Grain morphology and texture of Additively Manufactured (AM) alloys are responsible for the variation in mechanical properties as a function of build orientation. Therefore, equiaxed small grains with weak texture are desirable for aerospace component, and in particular for landing gear components subjected to multiaxial low cycle fatigue.

Improving the specific strength and fatigue properties of aerospace materials can be achieved by enabling finer, more equiaxed grain structures. According to the Hall-Petch relation, yield strength is inversely proportional to the square root of grain size. Therefore, a very small grain size (e.g., 100 microns) is desired since grain size affects hardenability as well as key plastic flow characteristics.

Laser-based additive manufacturing (AM) techniques such as laser powder bed fusion produce relatively small grain sizes compared to casting, for example, however the as additively manufactured (i.e., printed) microstructure exhibits elongated grain morphology parallel to the printing direction due to epitaxial growth leading to textured columnar grains. Grain morphology and texture are responsible for the variation in mechanical properties as a function of grain orientation. Therefore, equiaxed small grains with weak texture are highly desirable in aerospace components. For example, landing gear components may be formed and benefit from the use of high strength additively manufactured titanium (Ti) alloys such as Ti 185 alloy (also known as Ti-1A1-8V-5Fe, which is a β Ti alloy) as a substitute for heavy 300M steel forgings.

In pursuit of achieving Ti 185 properties approaching those of high strength steel, grain size reduction and improved grain morphology are associated with mitigating typical failure mechanisms. In accordance with various embodiments, introducing a tailored laser energy density and high-frequency vibrations on a deposited layer surface can be achieved by a combination of pulsed laser and high intensity ultrasonic treatment.

Disclosed herein is a system and methods for producing ultra-fine-grained materials using additive manufacturing. In various embodiments, the additive manufacturing may be adding to base material or building a material utilizing an additive process. In various embodiments, a pulsed laser with scan control is utilized to create smaller, more spherical melt pools, with fine grains and amorphous microstructure. In various embodiments, the process is ultrasonically enhanced to refine the grain structure to potentially reduce residual stresses. In various embodiments, the application of ultrasonic vibration to the melt breaks the growing dendrites and creates nucleation seeds at multiple locations within the bulk of the melt pool due to cavitation, thus refining grain structure and resulting in nanocrystalline grains. In various embodiments, table motion is added so as to provide movement of the material that further breaks the growing dendrites and creates nucleation seeds at multiple locations within the bulk of the melt pool due to cavitation, thus further refining grain structure and resulting in nanocrystalline grains. In various embodiments, application of high-intensity ultrasound to the melt during directed energy deposition (DED) yields fine equiaxed grains with random crystallographic texture, thus reducing anisotropy.

Referring now to FIG. 1, in accordance with various embodiments, an additive manufacturing system 100 is illustrated. The additive manufacturing system 100 combines pulsed lasing, ultrasonic enhancement, and table motion to create hybrid material microstructures comprising nanocrystalline structure in amorphous matrix. The additive manufacturing system 100 may use physics-driven model-assisted process maps, as shown FIGS. 3A and 3B, to create the hybrid material microstructures comprising nanocrystalline structure in amorphous matrix. Accordingly, in various embodiments, the additive manufacturing system includes pulsed laser 102, array of ultrasonic transducers 104, and table vibrator 106.

In various embodiments, the pulsed laser 102, operating in a process region predicted a priori using a phase field model, may fabricate an amorphous matrix where cooling rate is higher than $10^5$-$10^6$ Kelvin per second (K/s). In that regard, the pulsed laser 102 may be a laser that emits light not in a continuous mode, but rather in the form of optical pulses, e.g., light flashes. Accordingly, the pulsed laser 102 may emit nanosecond optical pulses, although other time framed optical pulses may be utilized. Thus, depending on the pulse duration, pulse energy, pulse repetition rate and wavelength required, different methods for pulse generation and different types of pulsed lasers may be used. In various embodiments, the pulsed laser 102 operates on additive powder provided via an additive powder feeder 108. In various embodiments, the additive powder feeder 108 may provide preheating of the additive powder prior to be utilized by the pulsed laser 102. In that regard, when the pulsed laser 102 emits an optical pulse within a process zone 110, the optical pulse adds the additive powder to a previous layer of material 112, i.e., and a base material, as a current layer of material 114. In various embodiments, the previous layer of material 112 may translate in at least one of a lateral direction, i.e., a left and right direction, an x-direction, or in a longitudinal direction, i.e., a back-and-forth direction, a y-direction, with respect to the pulsed laser 102. In various embodiments, the pulsed laser 102 may translate in at least one of a lateral direction, i.e., a left and right direction, an x-direction, or in a longitudinal direction, i.e., a back-and-forth direction, a y-direction, with respect to the previous layer of material 112. In various embodiments, controller 120 may be configured to control the pulsed laser 102 and additive powder feeder 108. The controller 120 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 120 may further include any tangible, non-transitory memory known in the art. The memory may store instructions usable by the logic device to perform operations as described herein.

In various embodiments, the array of ultrasonic transducers 104 creates ultrasonic vibrations in a first direction, i.e., in a vertical direction, in an up and down direction, in a z-direction. In that regard, the array of ultrasonic transducers 104 induce vibrations in the first direction at the current layer of material 114 or within the process zone 110 to specifically break the solidification front and create additional seeds the current layer of material 114 or within the process zone 110, which, in turn, forms nanocrystalline grains in amorphous matrix in the current layer of material 114 or within the process zone 110. In various embodiments, the ultrasonic transducers in the array of ultrasonic transducers 104 may be configured in an array, such as array configuration 116, in order to induce crystalline transition locally in a regular array, although other array configurations are also anticipated. In various embodiments, the array of ultrasonic transducers 104 may be piezoelectric transducers or tunable magnetostrictive transducers, among others, which can be adjusted in frequency to match the resonance condition of the previous layer of material 112. In various embodiments, the controller 120 may be configured to control the array of ultrasonic transducers 104.

In various embodiments, an ultrasonic pulsed laser 122 may be employed to excite ultrasonic vibrations in the melt. In various embodiments, the ultrasonic pulsed laser 122 follows the path of the pulsed laser 102 and excites ultrasonic waves into the melt prior to solidification. In various embodiments, control of the ultrasonic intensity the ultrasonic pulsed laser 122 enables grading the microstructure as desired. For example, the ultrasonic pulse of the ultrasonic pulsed laser 122 may be turned on and off at specific locations to yield finer, more equiaxed grains. In various embodiments, the controller 120 may be configured to control the ultrasonic pulsed laser 122.

In various embodiments, a table vibrator 106 vibrates table 124 in which the array of ultrasonic transducers 104 resides and on which the previous layer of material 112 is built. In various embodiments, the table vibrator 106 creates motion in one or more of a second direction, i.e., in a lateral direction, in a left and right direction, in a x-direction, or a third direction, i.e., in a longitudinal direction, in a back-and-forth direction, in a y-direction. The motion provided by the table vibrator specifically breaks the solidification front and creates additional seeds the current layer of material 114 or within the process zone 110, which, in turn, forms nanocrystalline grains in amorphous matrix in the current layer of material 114 or within the process zone 110. In various embodiments, the controller 120 may be configured to control the table vibrator 106.

Thus, fine grained and especially ultra-fine-grained materials (UFG), i.e., materials with a grain size from 30 nm to 1000 nm, generated using the above process(es) exhibit excellent strength at ambient temperature that make them desirable materials for safety applications such as landing gears. With stable grains, plastic properties of these materials at elevated temperatures are also excellent, which permits use of them for brake and gear applications.

Ultrasonically assisted additive manufacturing may increase the number density of grains, i.e., a number of grains per unit volume, by 9 times and 20 times for 316L grade stainless steel and Ti-6Al-4V alloy including 90% titanium (Ti), 6% aluminum (Al), 4% vanadium (V), respectively. Metals having grain sizes smaller than 1 micron may be produced either by deposition and/or repetitive excessive plastic deformation. In various embodiments, the additive manufacturing of layer-by-layer solidified structure with very fast cooling rate produces nanocrystalline structures and/or bulk metal glasses (BMG).

The trend of increasing yield strength with decreasing grain size may apply to grain sizes approaching 30 nm to 1000 nm. For BMG and finer-grained structure, the favorable elastic properties have been observed along with an increase in brittleness. Combination of fine grains embedded in BMG or superfine grained materials lead to the high yield, high elastic deformation capability, and high strength. Production of aerospace components can benefit from the UFG and BMG metals, particularly where high strength and low weight are required. One of the examples is nano-dynamic high-performance applications that utilizes the high elastic deformation under dynamic loading such as in landing systems. In this regard, a combination of fine grains embedded in BMG lead to nano-dynamic high-performance applications that utilizes the high elastic deformation under dynamic loading. Fine grained and especially ultra-fine-grained materials exhibit increased yield and ultimate tensile strength with little to no reduction in strain to failure.

Figure 2A:
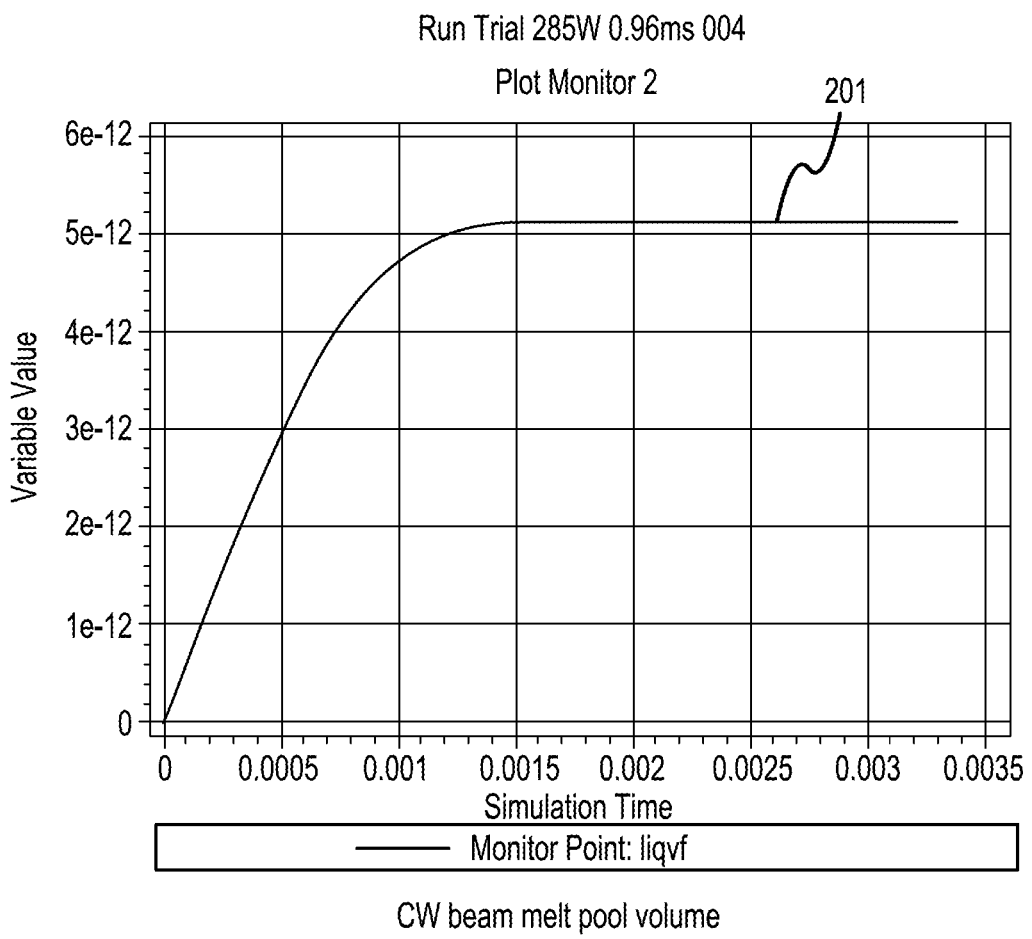
FIGS. 2A and 2B illustrate a continuous wave beam melt pool volume, in accordance with various embodiments.
Figure 2B:
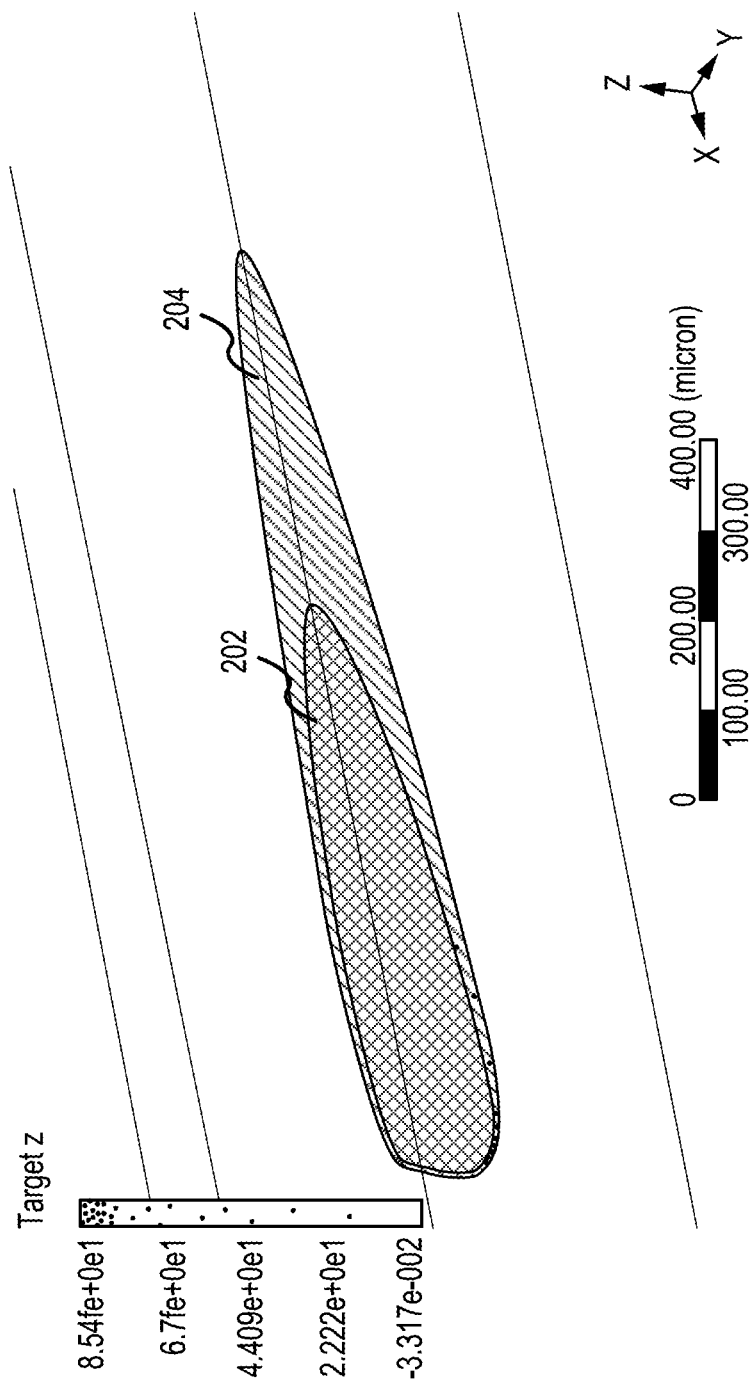

Referring now to FIGS. 2A and 2B, in accordance with various embodiments, a continuous wave beam melt pool volume is illustrated. In FIGS. 2A and 2B, a computational field dynamics (CFD) analysis is provided of a volume of a melt pool of a material under a continuous pulse of a laser. The CFD analysis utilizes computational field dynamics calculation (CFDC) of the melt pool depending on the velocity and how the melt pool changes the different flow through the material. This, with respect to FIG. 2B, the melt pool 202 of the material 204 changes with the velocity as the material moves to the right, i.e., in a lateral direction, in a positive x-direction. Thus, when a continuous wave 201 is provided as illustrated in FIG. 2A, i.e., constant energy is provided from a constant monotonic laser, the constant energy submission or supply cases a size of the volume of the melt pool to be large and elongated based on the movement of the material. In that regard, when a continuous wave is provided where only velocity may be changed, the melt pool may be stretched as is illustrated in FIG. 2B.

Figure 3A:
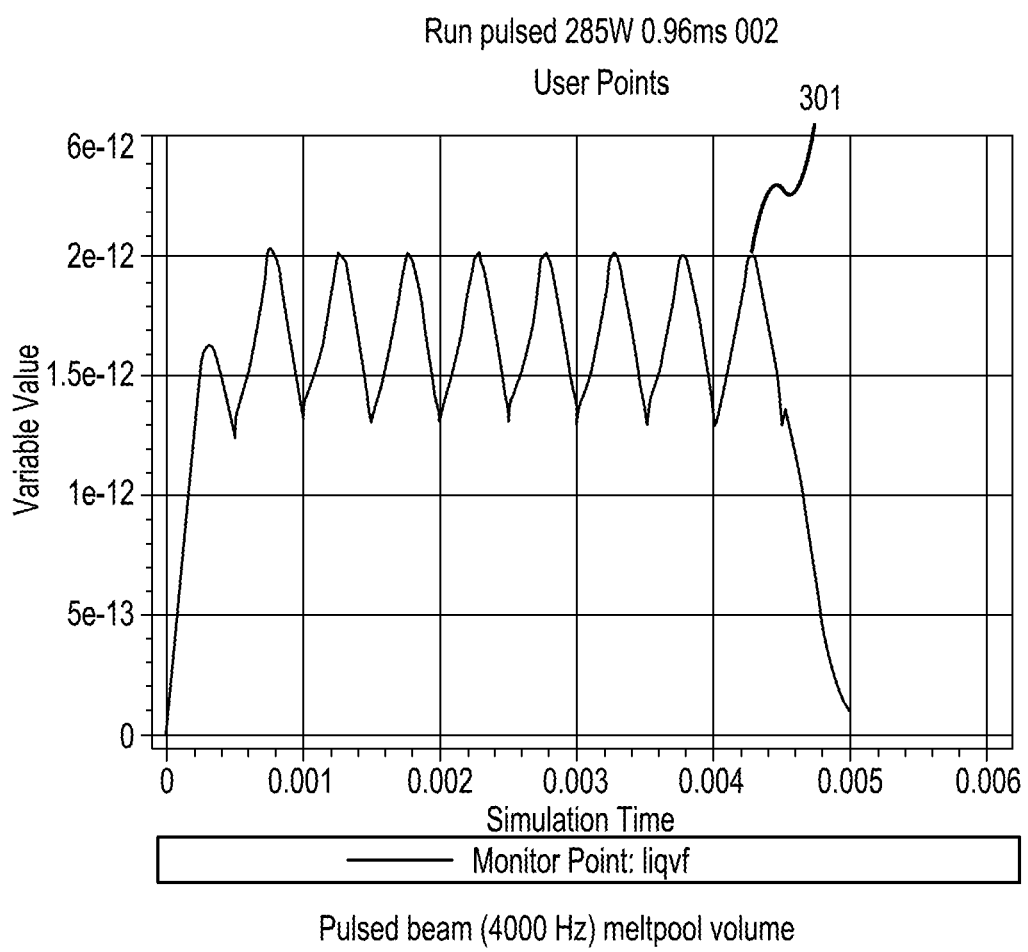
FIGS. 3A and 3B illustrate a pulsed wave beam melt pool volume, in accordance with various embodiments.
Figure 3B:
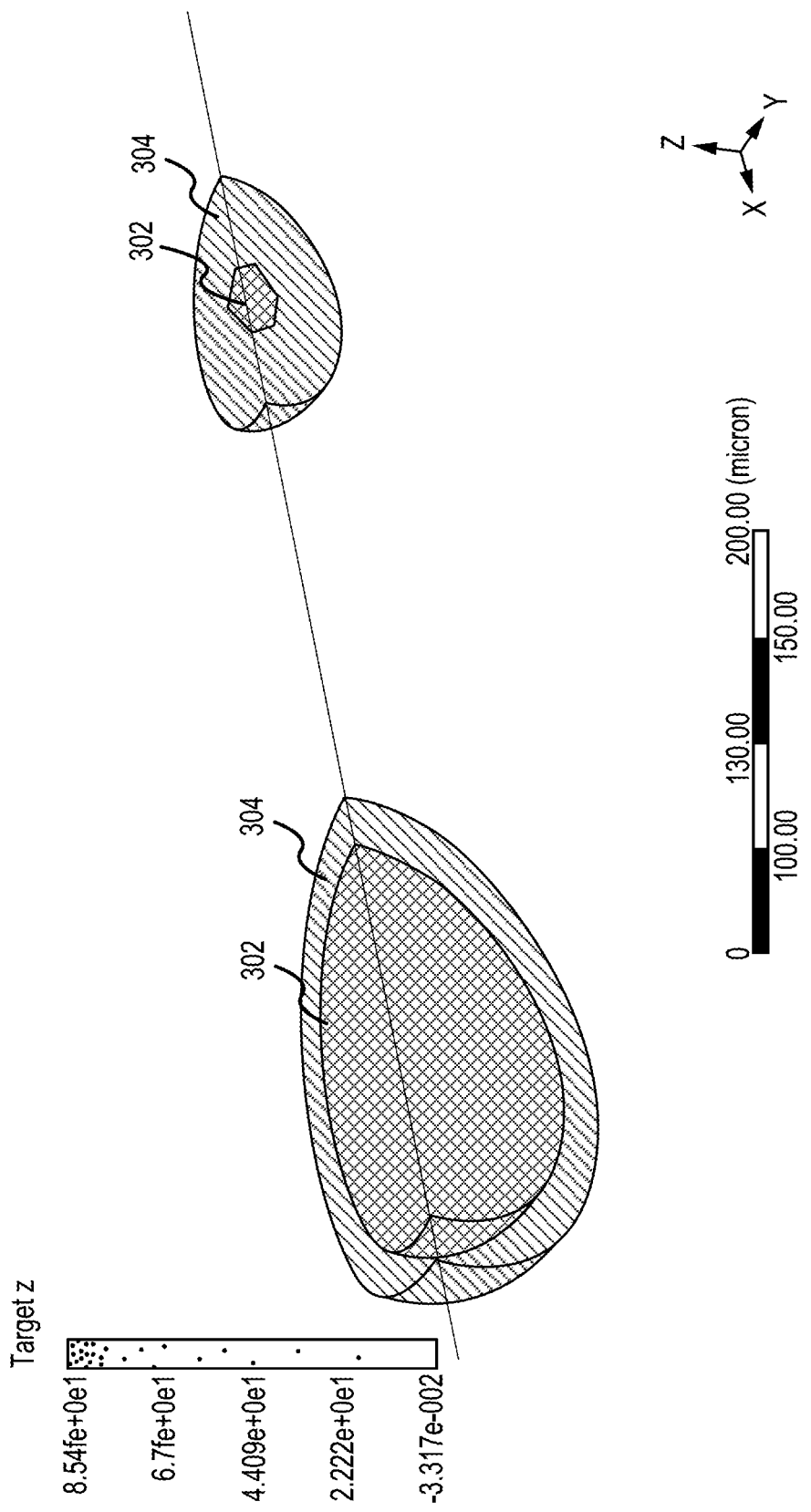

Referring now to FIGS. 3A and 3B, in accordance with various embodiments, a pulsed wave beam melt pool volume is illustrated. In FIGS. 3A and 3B, a CFD analysis is provided of a volume of a melt pool of a material under a pulsed laser. In utilizing a pulsed laser, such as pulsed laser 102 of FIG. 1, pulse width and pulse strength or amplitude may be varied. In that regard, by varying the pulse width and pulse strength or amplitude results in a different melt pool geometry. Therefore, by using a pulsed wave 301 as illustrated in FIG. 3A, shallow melt pools 302 may be created within the material 304, as illustrated in FIG. 3B, so that the ultrasonic vibration provided by an array of ultrasonic transducers, such as the array of ultrasonic transducers 104 of FIG. 1, may break down the formation of the dendritic structure inside and therefore, provide smaller grains which translates to much better properties. In that regard, utilizing a pulsed laser provides substantially more spherical melt pools that may be shallower melt pools generated using a continuous wave laser.

Figure 4:
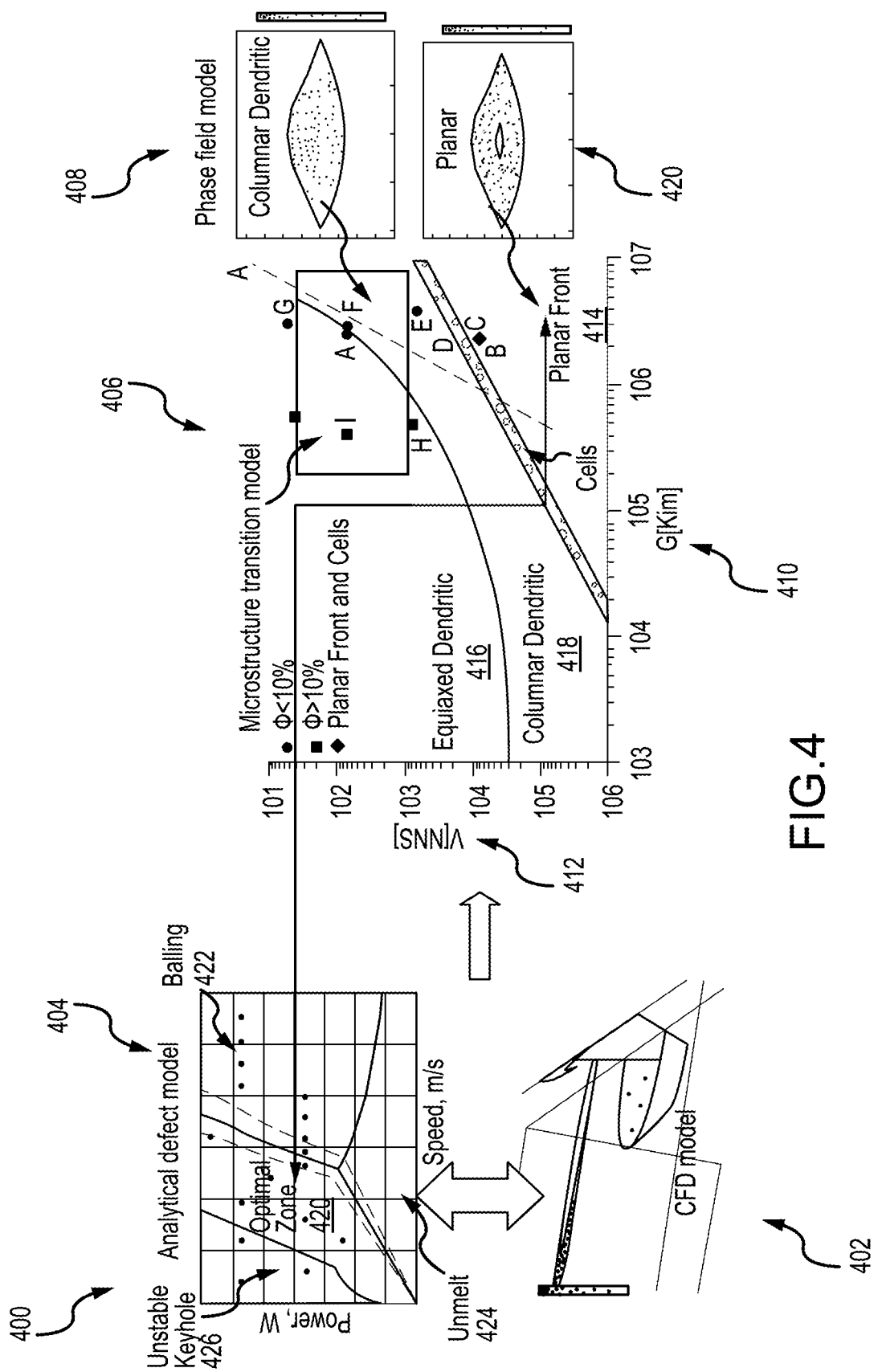
FIG. 4 illustrates a schematic showing use of computational field dynamics (CFD) CFD defect process map, solidification map, and phase field model to identify process zone that forms amorphous microstructure, in accordance with various embodiments.

Referring now to FIG. 4, in accordance with various embodiments, a schematic showing use of CFD, defect process map, solidification map, and phase field model to identify process zone that forms amorphous microstructure is illustrated. In various embodiments, the first variable is thermal gradient microstructure (G), the thermal gradient being a derivative of the temperate with respect direction. In various embodiments, the second variable is a velocity of solidification (V), i.e., how fast solidification takes place. As illustrated, if a thermal gradient is relatively high and velocity is relatively small, a planar front structure is expected. Alternatively, if the thermal gradient is relatively small and the velocity is relatively high, an equiaxed dendritic structure is expected. In between the planar front structure and the equiaxed dendritic structure it is expected to find columnar dendritic structures. In various embodiments, the optimal melt pool is in a zone referred to as an optimal zone, which is outside a balling zone, an unmelt zone and an unstable keyhole zone, each which coincide with the aforementioned planar front structure.

Figure 5:
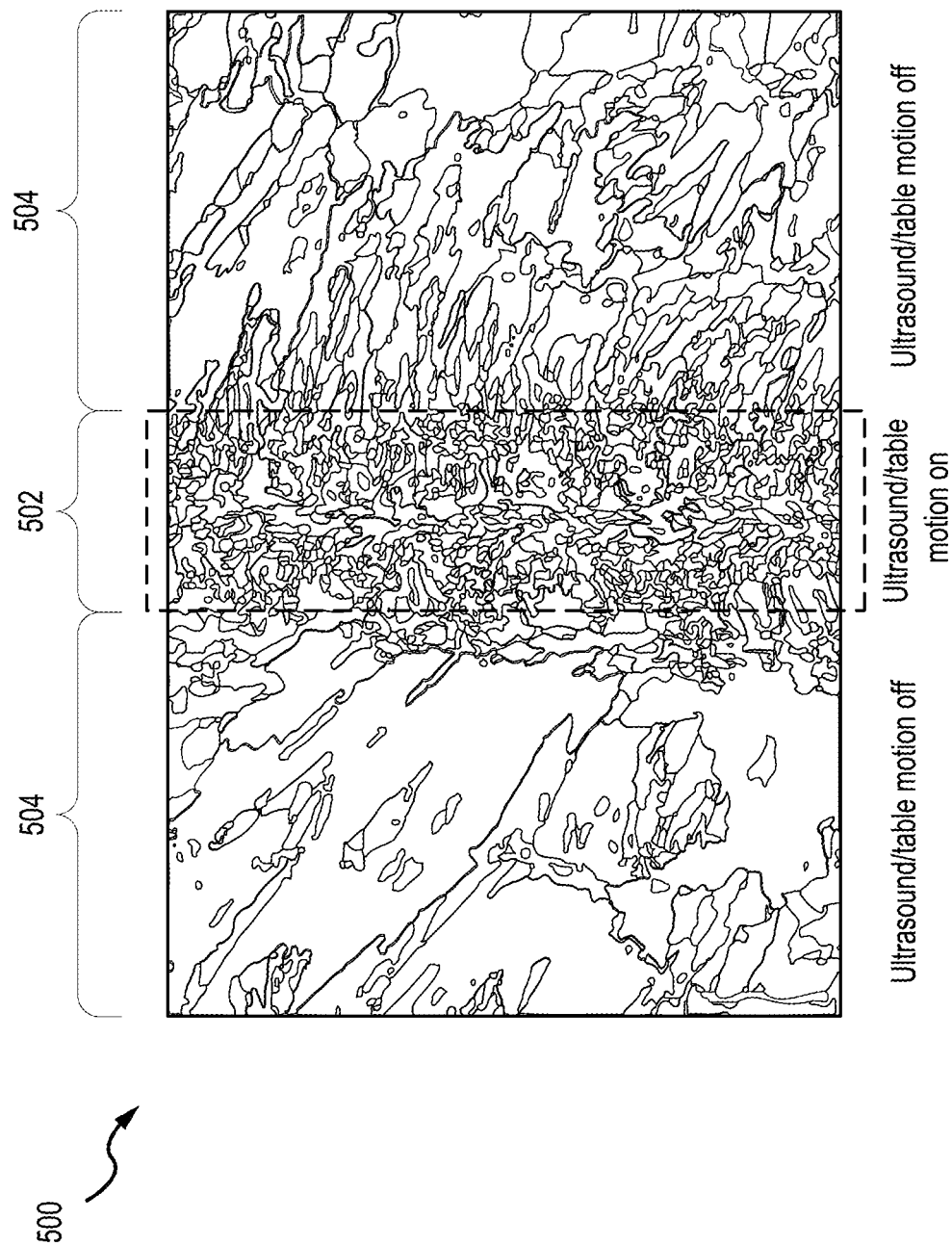
FIG. 5 illustrates a microstructure transition within a material achieved by turning ultrasonic vibration along with table motion on and off while using a pulsed laser, in accordance with various embodiments.

Referring now to FIG. 5, in accordance with various embodiments, a microstructure transition within a material achieved by turning ultrasonic vibration along with table motion on and off while using a pulsed laser is illustrated. In various embodiments, when vibrations are applied to a material 500 under modification of a pulsed laser, such as pulsed laser 102 of FIG. 1, the vibration being at least one of ultrasonic vibrations applied via an array of ultrasonic transducers 104, such as the array of ultrasonic transducers 104 of FIG. 1, or lateral and/or longitudinal vibrations via a table vibrator, such as table vibrator 106 of FIG. 1, fine equiaxed grains with random crystallographic texture are created as illustrated in zone 502 as opposed to the material 500 when vibrations are not applied as illustrated in zones 504.

Figure 6:
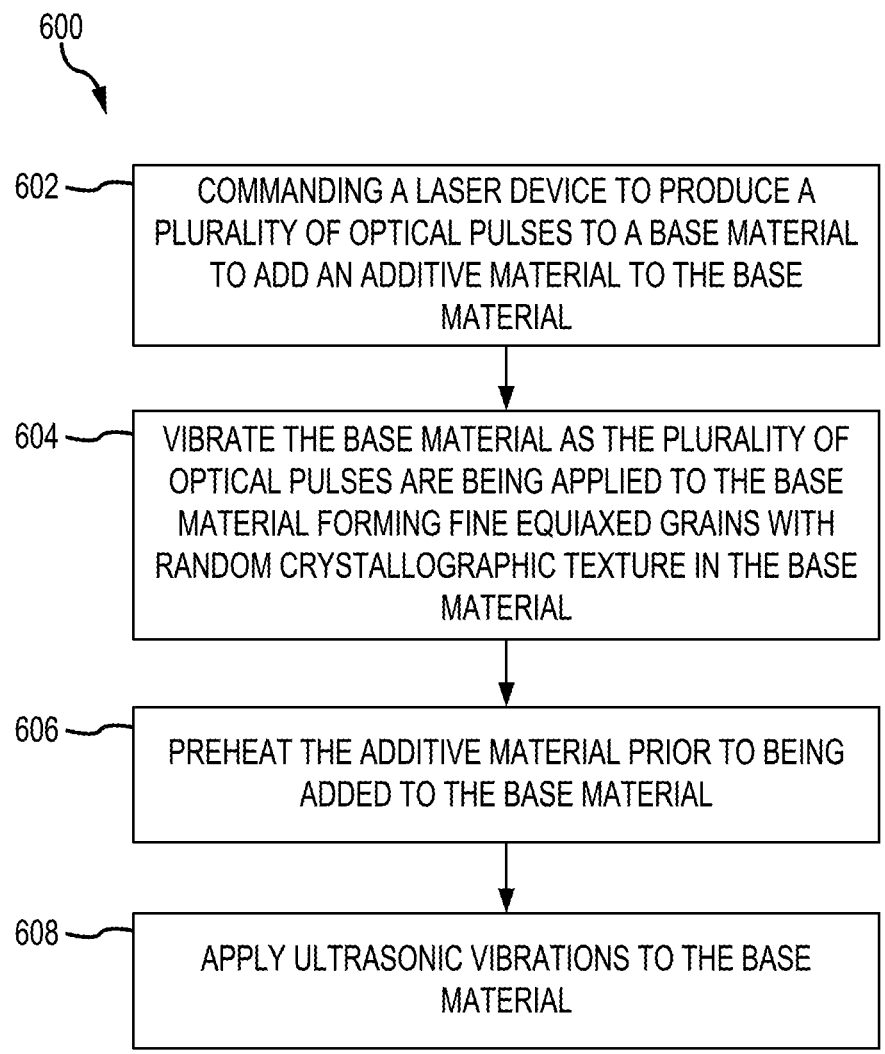
FIG. 6 illustrates a flow diagram of a method for producing ultra-fine-grained materials using additive manufacturing is illustrated.

Referring now to FIG. 6, in accordance with various embodiments, a method 600 for producing ultra-fine-grained materials using additive manufacturing is illustrated. The method 600 may be performed by a controller 120 described above with respect to FIG. 1. At block 602, the controller 120 commands a laser device, such as pulsed laser 102 of FIG. 1, to produce a plurality of optical pulses to a base material to add an additive material to the base material. At block 604, the controller 120 commands a vibration mechanism to vibrate the base material as the plurality of optical pulses are being applied to the base material forming fine equiaxed grains with random crystallographic texture in the material. In various embodiments, the vibration mechanism at least one of an array of ultrasonic transducers, such the array of ultrasonic transducers 104 of FIG. 1, or a table vibrator, such as table vibrator 106 of FIG. 1. In various embodiments, the vibration may be in at least one of a first direction, a second direction, or a third direction. In various embodiments, the first direction is a vertical direction. In various embodiments, the second direction is a lateral direction. In various embodiments, the third direction is a longitudinal direction. At block 606, the controller 120 commands an additive powder feeder to preheat the additive material prior to being added to the base material. At block 608, the controller 120 commands an ultrasonic pulsed laser that follows a pulsed laser that is applying the plurality of optical pulses to apply ultrasonic vibrations to the base material.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Systems, i.e., control systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for producing ultra-fine-grained materials using additive manufacturing, the method comprising:
    commanding, by a controller, a pulsed laser to produce a plurality of optical pulses to a base material to add an additive material to the base material in a melt pool of the base material;
    commanding, by the controller, a vibration mechanism to vibrate the base material as the plurality of optical pulses are being applied to the base material forming fine equiaxed grains with random crystallographic texture in the base material; and
    commanding, by the controller, an ultrasonic pulsed laser that follows the pulsed laser that is applying the plurality of optical pulses to apply ultrasonic vibrations to a melt of the melt pool of the base material.

2. The method of claim 1, wherein the laser device is a pulsed laser.

3. The method of claim 1, wherein the vibration mechanism is an array of ultrasonic transducers and wherein the controller commands the array of ultrasonic transducers to vibrate the base material in a first direction.

4. The method of claim 3, wherein the first direction is a vertical direction.

5. The method of claim 1, wherein the vibration mechanism is a table vibrator and wherein the controller commands the table vibrator to vibrate the base material in at least one of a second direction or a third direction.

6. The method of claim 5, wherein the second direction is a lateral direction.

7. The method of claim 5, wherein the third direction is a longitudinal direction.

8. The method of claim 1, further comprising:
    commanding, by the controller, an additive powder feeder to preheat the additive material prior to being added to the base material.

* * * * *